United States Patent [19]
Meijer

[11] Patent Number: 5,853,776
[45] Date of Patent: Dec. 29, 1998

[54] INJECTION MOLDING SYSTEM HAVING A SPACER MEMBER

[75] Inventor: Hans Meijer, Dordrecht, Netherlands

[73] Assignee: Eurotool Beheer B.V., 's-Gravendeel, Netherlands

[21] Appl. No.: 854,253

[22] Filed: May 9, 1997

[30] Foreign Application Priority Data

May 10, 1996 [EP] European Pat. Off. .............. 96201291

[51] Int. Cl.[6] .................................................. B29C 45/17
[52] U.S. Cl. .......................................... 425/570; 425/572
[58] Field of Search ................................ 425/549, 570, 425/572

[56] References Cited

U.S. PATENT DOCUMENTS

| | | | |
|---|---|---|---|
| 4,588,367 | 5/1986 | Schad | 425/549 |
| 5,206,040 | 4/1993 | Gellert | 425/570 |
| 5,217,730 | 6/1993 | Teng | 425/572 |
| 5,421,716 | 6/1995 | Gellert | 425/549 |
| 5,427,519 | 6/1995 | Gellert | 425/549 |

FOREIGN PATENT DOCUMENTS

| | | |
|---|---|---|
| 0 264 723 | 4/1988 | European Pat. Off. . |
| 0 470 405 | 2/1992 | European Pat. Off. . |

*Primary Examiner*—Tim Heitbrink
*Attorney, Agent, or Firm*—Young & Thompson

[57] ABSTRACT

An injection molding system having a manifold element (5) carrying a melt passage (2); the manifold element (5) being connected to an inlet (3) at one end for receiving molten material and at the other end a nozzle (7) opening into a gate (21) of the mold; the manifold element (5) being heated, and spaced from relatively large bodies, such as clamped plate elements (14) or cavity plate elements (11) which are less heated, unheated or cooled by relatively thin-walled spacer members (12); the spacer members (12), having two oppositely directed bearing surfaces the one bearing against the manifold elements (5), the other bearing against said body; and a relatively thin-walled wall part (17) extending between the bearing surfaces; the wall parts (7) having a curvature to be resilient for compression and extension in the direction from the one bearing surface towards the other bearing surface.

14 Claims, 2 Drawing Sheets

5,853,776

INJECTION MOLDING SYSTEM HAVING A SPACER MEMBER

BACKGROUND OF THE INVENTION

This invention relates generally to injection molding and more particularly to an improved heated manifold system for conveying pressurized melt from an inlet to an outlet leading to a cavity. More particularly, the invention relates to conveying pressurized melt from a single inlet to a number of spaced outlets each leading to a different cavity. The following description is related to multi-cavity injection molding. However, it will be understood that the following description is not limiting the scope of the invention as delimited by the accompanying claims.

DESCRIPTION OF THE RELATED ART

In an injection molding system, as a rule, there are relatively hot and relatively cold parts which are separated from each other by insulative air spaces for which reason spacers or pressurepads are provided between those parts. Such spacers must withstand very considerable injection forces, and considerable temperatures as well. For instance, U.S. Pat. No. 4,768,945 illustrates a solid pressurepad made of titanium, mounted between the heated manifold and the cold back plate to reduce its loss. Such a known solid pressurepad made of titanium is expensive, and has further the disadvantage that it is not resilient to allow for thermal expansion and/or variations in component tolerances and injection forces. U.S. Pat. No. 4,588,367 illustrates a compressible pressurepad to allow for thermal expansion. U.S. Pat. No. 4,740,151 illustrates a bushing having a slightly resilient outer flange portion for a valve gated injection molding system. These prior art devices, although suitable for particular situations for applications, have the disadvantages that they are relatively costly to manufacture, and they do not have a broad application for a variety of different injection molding systems. Recent developments have shown, that injection molding systems will become smaller and more temperatures sensitive molding materials will be used. Therefore, the degree of resilience and the reduced thermal conductivity of the spacer members have become much more critical.

EP-A-0 470 405 illustrates an injection molding insulative and resilient spacer member. Said known spacer member has a plurality of V-shaped concentric rings which provide a uniform cross-section having a plurality of wrapped portion extending diagonally between alternate forward and rearward ridge portions. Therefore, said known spacer member provides for a plurality of concentric bearing surfaces at two opposite sides for bearing against the bodies which must be thermally insulated by an air gap. Based on the drawings, said known spacer element has a rather complicated design and demand for accurate manufacturing and reliable quality control.

SUMMARY OF THE INVENTION

It is an object of the present invention to provide an injection molding system having a spacer member which can be manufactured rather cheap, that is less sensitive to the level of accuracy of manufacturing, allowed for a rather broad range of tolerances, has a predetermined combination of strengths, resilience and reduced thermal conductivity, and can be of a design such that its configuration can be adapted to the specific structure in which it will be used to allow for a broad application for a variety of different injection molding systems. A further object for the present invention is to allow for the use of relatively cheap materials such as metal materials, instead of ceramic materials.

To this end, in one of its aspects, the invention provides an injection molding system according to the combination of features as indicated in the accompanying independent claims. Preferred embodiments, providing for further objects and advantages of the invention, are indicated in the dependent claims in another aspect, the invention provides a spacer member for an injection molding system having the combination of features as indicated in the accompanying claims. Preferred embodiments of the spacer member according to the invention, providing for further objects and advantages, are indicated in the dependent claims.

BRIEF DESCRIPTION OF THE DRAWINGS

Further objects and advantages of the invention will appear from the following description taken together with the accompanying drawings.

DESCRIPTION OF THE PREFERRED EMBODIMENTS

Figure 1:
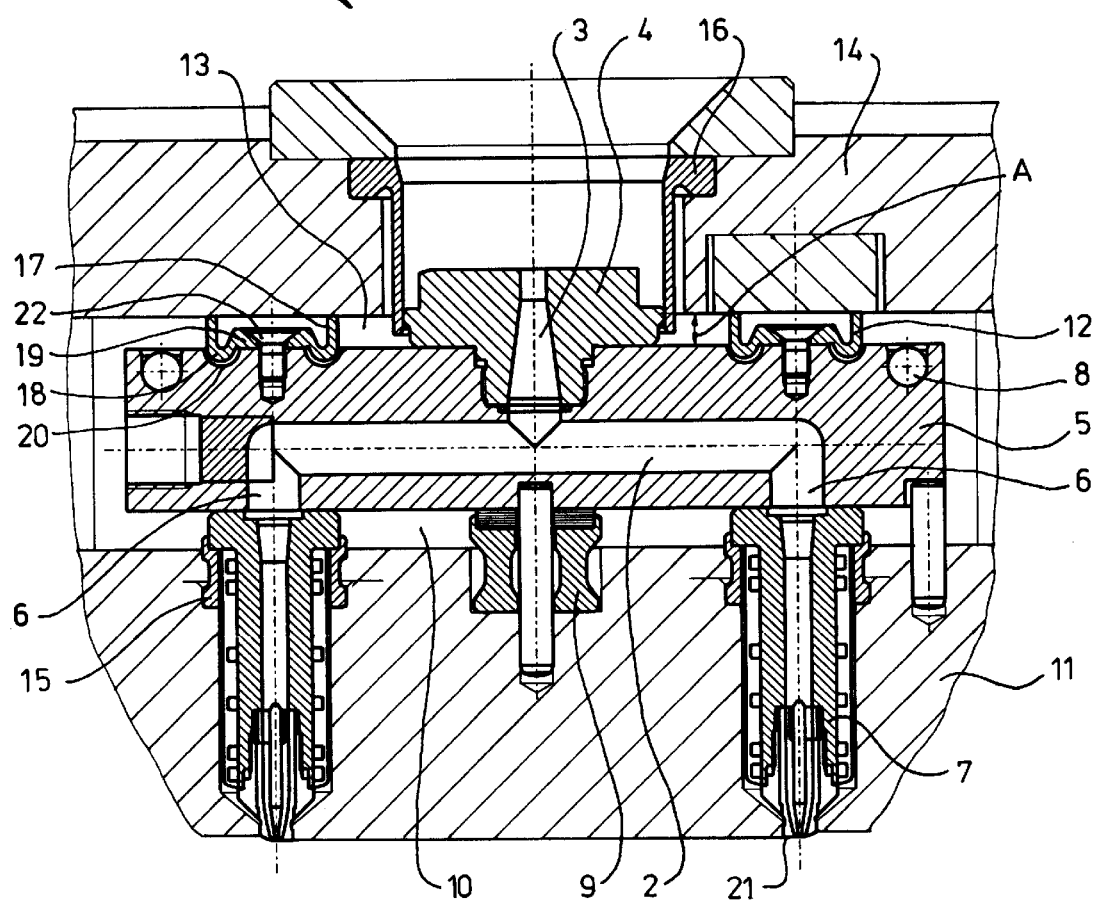
FIG. 1 is a sectional view of a part of a heated multi-cavity injection molding system.

First referring to FIG. 1, a portion of a multi-cavity injection molding system 1 is shown. A melt passage 2 extends from a common inlet 3 in a manifold extension 4 to an elongated manifold 5 where it branches out to a number of outlets 6. Each outlet 6 leads to a nozzle 7. While a particular nozzle 7 is shown, without a valve-closure and with electrical heating, the invention can be applied equally as well with a variety of other injection molding systems using heated probes or heated nozzles. The invention allows for another design of the manifold 5 and the melt passage 2 as well.

The elongated manifold 5 is heated by an electrical heating wire 8 which is integrally brazed into it. The manifold 5 is secured in a position by a central locating ring 9 which bridges an insulative air space 10 between the heated manifold 5 and a cooled cavity plate 11, and by the spacer member 12, which are described in great detail below, in which bridge an insulative air space 13 between the heated manifold 5 and a cooled clamp plate 14. The cavity plate 11 and the clamp plate 14 are cooled by pumping cooling water through cooling channels (not shown). In a manner known per se, the clamp plate 14 is secured in place by bolts (not shown) which extend into the cavity plate 11. In a manner known per se as well, the manifold extension 4 is, in turn, held in place by threading and a locating collar as illustrated.

The nozzles 7 are of a design known per se, and do not have to be described in further detail. Hollow fitting 15, surrounding the back of a nozzle 7, has a recessed outer side-wall for increase of resistance in thermal conductivity by decreasing cross-sectional area. The fitting 16 for the manifold extension 4 is for the same reason thin-walled and is undercut at the transition to the boss at one of its frontal ends.

Each nozzle 7 debouches into a gate 21 leading to a mold-cavity (not shown).

As indicated in FIG. 1, each spacer member 12 has a cylindrical, thin-walled, shape. Its side-wall 17 has a curved extension 18 extending beyond a cross-wall 19 which is penetrated by a screw 22 and which cross-wall 19 bears against the elongated manifold 5. The elongated manifold 5 has an annular recess 20 such that a clearance with the extension 18 of the spacer element 12 is maintained. Due to the extension 18 with the curvature, the spacer element 12 is resilient in the direction indicated with arrow A.

Figure 2:
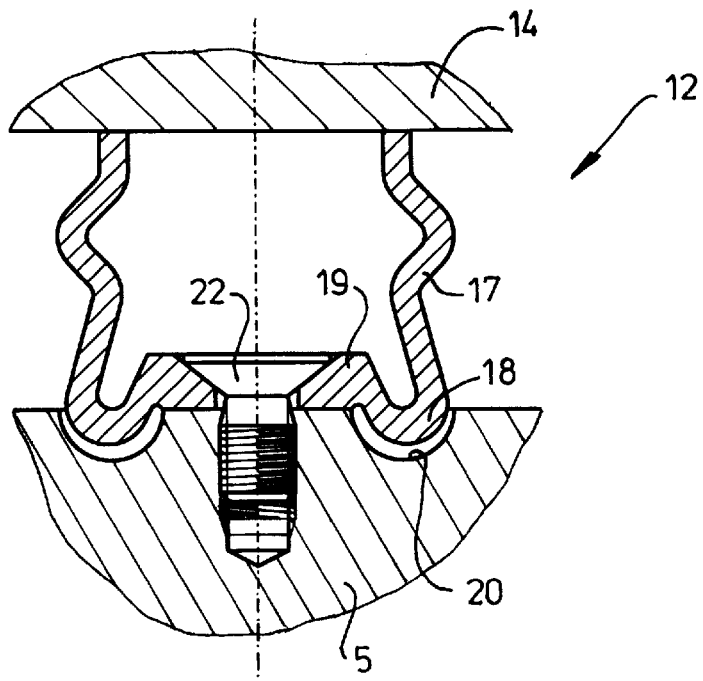
FIG. 2 is a detail of FIG. 1, showing an alternative.

FIG. 2 illustrates an alternative embodiment of the spacer element 12. In this situation, the side-wall 17 is corrugated.

Figure 3:
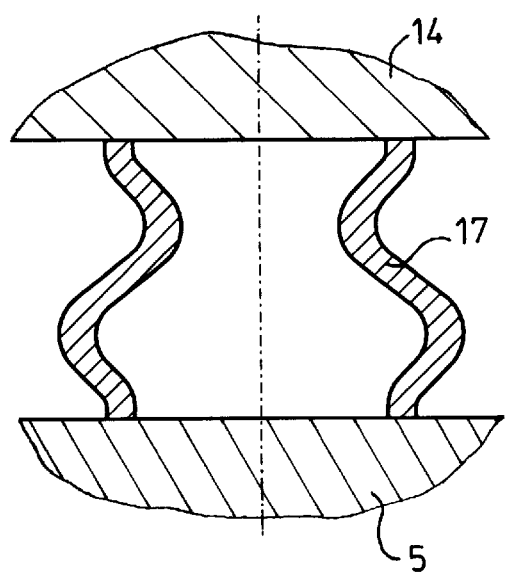
FIG. 3 is a view similar to FIG. 2, showing a further alternative.

FIG. 3 shows a further embodiment of the spacer element 12. In this embodiment, the side-wall 17 is even more corrugated. Compared to FIG. 1 and 2, the spacer elements 12 according to FIG. 3 has no cross-wall 19 and no extension 18 of the side-wall 17. However, as further embodiments within the scope of the invention, the corrugated side-wall 17 of FIG. 3 can be combined with the extension 18 and/or the cross-wall 19 of FIG. 2. Other alternative embodiments comprised cross-walls 19 at both frontal ends of the spacer element 12, possibly with or without the extension 18. As a further alternative to the spacer element 12 as shown in FIG. 1, the cross-wall 19 can be left out and the recess 20 of the elongated manifold 5 could be left out too, such that the bearing surface of the spacer element 12 adjacent the elongated manifold 5 is provided by the outer curvature of the extension 18 which provides for resilience in some extent as well, however, of less magnitude compared to the embodiments which are illustrated in the drawings.

I claim:

1. An injection molding system comprising:
    a spacer member; and
    a manifold element carrying a melt passage,
    said manifold element being connected to an inlet at a first end for receiving molten material and at a second end to a nozzle opening into a gate of a mold,
    said manifold element being heated, and being spaced from at least one of a clamped plate element and a cavity plate element by said spacer member,
    said spacer member comprising a thin walled, annular spacer having an annular wall generally extending in a direction of a center line of the spacer member, and two oppositely directed bearing surfaces extending transversely to the center line,
    said annular wall comprising a first resilient wall part located between the oppositely directed bearing surfaces in the form of a step or a bend part extending transversely to the general direction of the annular wall.

2. The injection molding system of claim 1, wherein the first resilient wall part comprises a first section extending towards the center line of the annular wall, and adjacent to said first section, a second section extending away from the center line of the annular wall.

3. The injection molding system of claim 1, wherein the annular wall comprises, in a region of at least one bearing surface, a transverse, second resilient wall part extending transversely to the center line, the at least one bearing surface being located adjacent said second resilient wall part,
    wherein said second resilient wall part projects beyond said at least one bearing surface, and
    wherein a recess of said manifold element provides a clearance for said second resilient wall part.

4. The injection molding system of claim 3, wherein the spacer member further comprises a cross wall comprised of the bearing surface adjacent the second resilient wall part,
    said cross wall being penetrated by a fastening element engaging into said manifold element.

5. The injection molding system of claim 1, wherein said spacer member is manufactured of one of metal and ceramic material.

6. A spacer member for use in an injection molding system to bridge an insulative air space between a heated manifold and an unheated member, comprising:
    an annular wall generally extending in a direction of a center line of the spacer member, and
    two oppositely directed bearing surfaces extending transversely to the center line,
    wherein the annular wall comprises a first resilient wall part located between the oppositely directed bearing surfaces shaped in the form of a step or a bend part extending transversely to the general direction of the annular wall.

7. The spacer member of claim 6, wherein the first resilient wall part comprises a first section extending towards the center line of the annular wall, and adjacent to said first section, a second section extending away from the center line of the annular wall.

8. The spacer member of claim 6, wherein the annular wall comprises, in a region of at least one of said bearing surfaces, a transverse, second resilient wall part extending transversely to the center line, said at least one bearing surface being located adjacent said second resilient wall part, wherein said second resilient wall part projects beyond said at least one bearing surface.

9. The spacer member of claim 8, wherein the at least one bearing surface adjacent the second resilient wall part is part of a cross wall comprising an opening designed to be penetrated by a fastening element for engaging said cross wall onto said manifold.

10. A spacer member for use in an injection molding system to bridge an insulative air space between a heated manifold and an unheated member and to provide resiliency between said heated manifold and said unheated member, comprising:
    first and second annular wall elements comprised of plural, generally parallel corrugations running in a generally longitudinal direction of said first and second wall elements,
    each of said first and second wall elements further comprising a first lateral end and a second lateral end,
    said first lateral ends being fixed to said unheated member and said second lateral ends being fixed to said heated manifold so that resiliency is provided between said heated manifold and said unheated member by deflection of said first and second annular wall elements in a direction of compression.

11. The spacer member of claim 10, wherein said second lateral end of said first annular wall element and said second lateral end of said second annular wall element are joined so that said first annular wall element and said second annular wall element are formed of a single shaped metal piece.

12. The spacer member of claim 11, wherein said joined second lateral ends are fixed to said heated manifold by a fastening member penetrated said joined second lateral ends.

13. The spacer member of claim 11, wherein said second lateral end of said first annular wall element and said second lateral end of said second annular wall element each extend into a recess of said heated manifold.

14. The spacer of claim 10, wherein said first annular wall element and said second annular wall element are each formed of a single shaped metal piece.

* * * * *